United States Patent [19]

Tarum

[11] Patent Number: 4,828,297
[45] Date of Patent: May 9, 1989

[54] FLUID COUPLING

[75] Inventor: Carl D. Tarum, Saginaw, Mich.

[73] Assignee: General Motors Corporation, Detroit, Mich.

[21] Appl. No.: 211,608

[22] Filed: Jun. 27, 1988

[51] Int. Cl.⁴ .................. F16L 37/00; F16L 19/00; F16L 33/18

[52] U.S. Cl. .................................... 285/305; 285/348

[58] Field of Search ............... 285/305, 319, 321, 238, 285/308, 348

[56] References Cited

U.S. PATENT DOCUMENTS

| | | | |
|---|---|---|---|
| 2,496,938 | 2/1950 | Friedman | 285/305 X |
| 2,550,591 | 4/1951 | Parsons | 285/319 |
| 2,721,090 | 10/1955 | Kaman | 285/305 X |
| 3,093,703 | 6/1963 | Zavertnik | 285/321 X |
| 3,215,455 | 11/1965 | Fiala et al. | 285/319 X |
| 3,810,073 | 5/1974 | Zajac et al. | 285/319 X |
| 3,814,135 | 6/1974 | Hetzer et al. | 138/89 |
| 3,826,523 | 7/1974 | Eschbaugh | 285/39 |
| 3,847,421 | 12/1974 | Eschbaugh et al. | 285/353 |
| 3,858,913 | 1/1975 | Gallagher | 285/319 X |
| 3,977,710 | 8/1976 | Ridenour | 285/382.5 |
| 4,193,616 | 3/1980 | Sarson et al. | 285/321 X |
| 4,266,814 | 5/1981 | Gallagher | 285/319 |
| 4,332,402 | 1/1982 | Shellhause | 285/86 |
| 4,526,411 | 7/1985 | Bartholomew | 285/305 |
| 4,637,640 | 1/1987 | Fournier et al. | 285/319 |
| 4,697,832 | 10/1987 | Dickirson | 285/319 |
| 4,753,459 | 6/1988 | Potier | 285/305 |

FOREIGN PATENT DOCUMENTS 0964323 10/1982 U.S.S.R. .............................. 285/305

Primary Examiner—Randolph A. Reese
Assistant Examiner—Paul Frechette
Attorney, Agent, or Firm—Saul Schwartz

[57] ABSTRACT

A coupling between an end of a fluid conducting tube and a socket in a housing at the end of a fluid conducting passage in the housing. An annular shoulder on the tube seats on an annular base of the socket in an installed position of the tube and a annulus is defined between the outside of the tube and a circular entry to the socket above the base. A tubular plastic retainer, slidably disposed on the tube behind the annular shoulder and outside the socket, has an outwardly flared front end section which is squeezed to the smaller diameter of the circular entry and pushed into the annulus between the entry and the tube. In a seated position of the retainer, the flared front end section radially overlaps the annular shoulder so that a shear section of the retainer is defined between the annular shoulder and the circular entry. The shear section resists withdrawal of the tube from the socket.

2 Claims, 2 Drawing Sheets 4,828,297

FLUID COUPLING

FIELD OF THE INVENTION

This invention relates to fluid couplings

BACKGROUND OF THE INVENTION

Quick connect fluid couplings generally require only the single step of plugging a free end of a fluid conducting tube into a socket to effect a connection between the tube and the socket. Some quick connect couplings incorporate internal spring finger retention arrangements wherein spring fingers on a retainer on the free end of the tube are captured behind a lip around an entry to the socket, the spring fingers thus being located internally or inside the socket in the installed or plugged-in position of the free end of the tube. A quick connect coupling incorporating an external or outside spring finger retention arrangement is described in U.S. Pat. No. 4,332,402, issued June 1, 1982 to Shellhause and assigned to the assignee of the invention. In that coupling, a barrel shaped retainer having inturned, flexible spring fingers at both ends is mounted on the outside of a cylindrical housing. The spring fingers at one end of the retainer grip an outside groove on the housing to hold the retainer on the latter. The spring fingers at the other end of the retainer cover a portion of the entry to a socket in the end of the housing. When the free end of the tube is plugged into the socket, the spring fingers over the entry lodge behind a shoulder on the tube for retention of the tube. A fluid coupling according to this invention is like a quick connect coupling in that a connection is effected between a tube and a socket by sequentially plugging both the tube and a retainer thereon into the socket and represents a novel alternative to quick connect couplings having internal or external spring finger retention arrangements.

SUMMARY OF THE INVENTION

This invention is a new and improved coupling between the free end of a fluid conducting tube and a socket in a housing. In the coupling according to this invention, the socket has an annular base around an end of a fluid passage in the housing, a smaller diameter circular entry over the base, and a diverging contoured inside wall between the entry and the base. The free end of the tube has an annular shoulder thereon of diameter generally equal to the diameter of the circular entry. A retainer is slidably disposed on the tube behind the annular shoulder and includes a longitudinally slotted, outwardly flared front end section contoured to match the contour of the inside wall of the socket. The free end of the tube is plugged into the socket through the entry to an installed position characterized by engagement between the annular shoulder and the base. The front end section of the retainer is squeezed to the smaller diameter of the circular entry to the socket and forced into the socket between the annular shoulder on the tube and the inside wall of the socket, the remaining or back end section of the retainer projecting out of the socket between the tube and the circular entry. A shear section of the retainer is defined between the circular entry and the annular shoulder on the tube and resists withdrawl of the tube from the socket.

DESCRIPTION OF A PREFERRED EMBODIMENT

Figure 1:
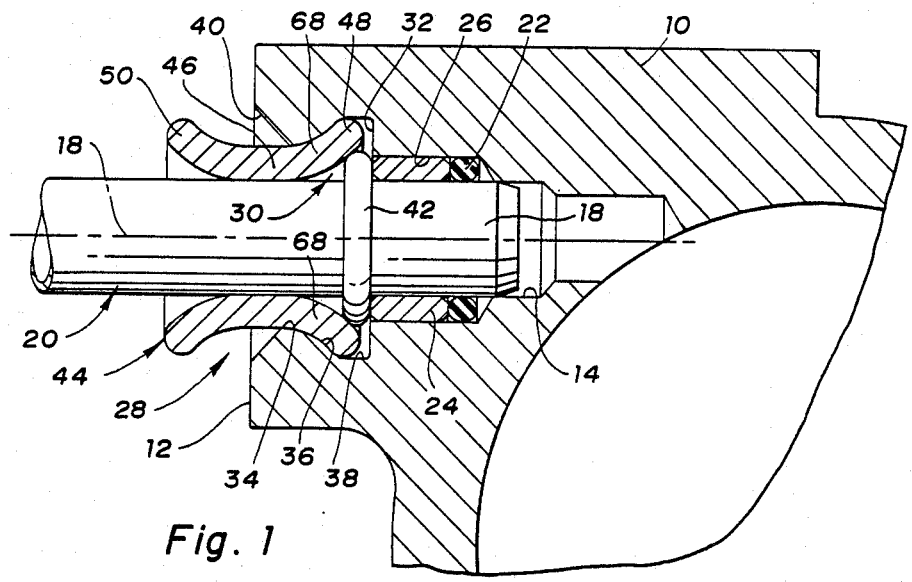
FIG. 1 is a cross sectional view of a fluid coupling according to this invention connecting a fluid conducting tube to a housing.

Referring to FIG. 1 of the drawings, a representative body member or housing 10 has a planar wall 12 and an internal fluid conducting passage 14 aligned on an axis 16 of the housing perpendicular to the wall 12. A partially tapered pilot section 18 of a fluid conducting tube 20 at the free or distal end thereof is closely received in the passage 14. A seal ring 22 and sleeve 24 are disposed in an enlarged portion 26 of the passage 14 and grip the pilot section 18 of the tube. A fluid coupling 28 according to this invention connects the fluid conducting tube 20 to the housing 10.

The fluid coupling 28 includes a socket 30 in the housing 10 centered on the axis 16. The socket 30 has an annular base 32 around the enlarged portion 26 of the fluid passage 14, a circular entry 34 above the base 32, and a contoured inside wall 36 which diverges from the entry 34 toward the larger diameter of base 32. The annular base 32 is the part of the bottom surface of the socket 30 surrounding the hole in the bottom surface defined by the enlarged portion 26 of the passage 14 where the enlarged portion intersects the bottom of the socket. The inside wall 36 merges with a clearance groove 38 located immediately adjacent the base 32. The entry 34 defines an inlet to the socket 30 through the planar wall 12 of the housing 10. A lead-in chamfer 40 around the entry 34 opens outward toward the planar wall 12.

The fluid coupling 28 further includes an annular shoulder or bead 42 on the fluid conducting tube 20 which separates the pilot section 18 from the remainder of the tube. The diameter of the annular shoulder 42 exceeds the diameter of the tube 20 and the diameter of the enlarged portion 26 of the passage 14 but is slightly smaller than the diameter of the circular entry 34. In an installed position of the tube 20 relative to the housing 10, FIGS. 1 and 5C, the annular shoulder 42 seats against the base 32 of the socket 30.

The fluid coupling 28 further includes a tubular retainer 44. The retainer 44 is preferably molded plastic, such as heat stabilized, impact modified 6/6 nylon marketed by GI duPont deNemours & Co. as Zytel 3189 HSL, but may be made of metal or other material having suitable performance characteristics. The retainer 44 has a generally cylindrical center section 46, a front end section 48 at one end of the center section, and a back end section 50 at the other end of the center section. The front and back end sections are identical and are outwardly flared or contoured relative to the center section 46 to match the contour of the inside wall 36 of the socket 30. The diameters of the front and back end sections 48 and 50 exceed the diameter of the circular entry 34 and generally equal the diameter of the annular base 32 of the socket 30. The wall thickness of the retainer 44 corresponds generally to one-half the difference between the diameter of the circular entry 34 and the diameter of the tube 20.

Figure 2:
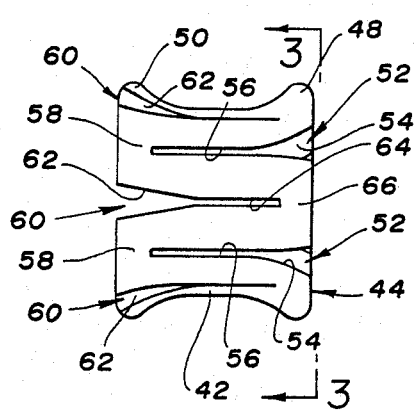
FIG. 2 is an elevational view of a retainer of the fluid coupling according to this invention.
Figure 3:
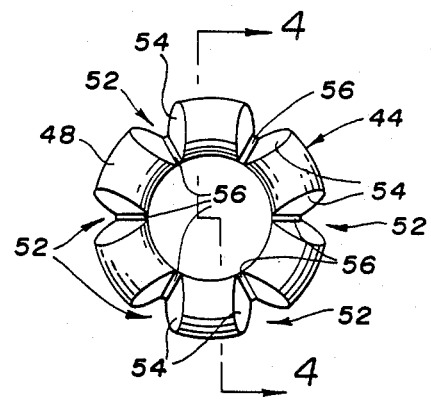
FIG. 3 is a view taken generally along the plane indicated by lines 3—3 in FIG. 2.

As seen best in FIGS. 2 and 3, the retainer 44 is interrupted by a plurality of circumferentially spaced longitudinal front slots 52 which transverse the front end section 48 and the center section 46 of the retainer. Each slot 52 has a flared skirt portion 54 opening through the front end section 48 and a more narrow kerf portion 56 which terminates short of the back end section 50 of the retainer. A plurality of webs 58, FIG. 2, of the retainer are thus defined at the closed ends of the slots 52.

The retainer 44 is further interrupted by a plurality of circumferentially spaced longitudinal back slots 60 which traverse the back end section 50 and the center section 46 of the retainer. The back slots 60 are interposed between respective adjacent pairs of front slots 52. Each back slot 60 has a flared skirt portion 62 opening through the back end section 50 and a more narrow kerf portion 64 which terminates short of the front end section 48 of the retainer. A plurality of webs 66 of the retainer are thus defined at the closed ends of the slots 60.

Figure 5A:
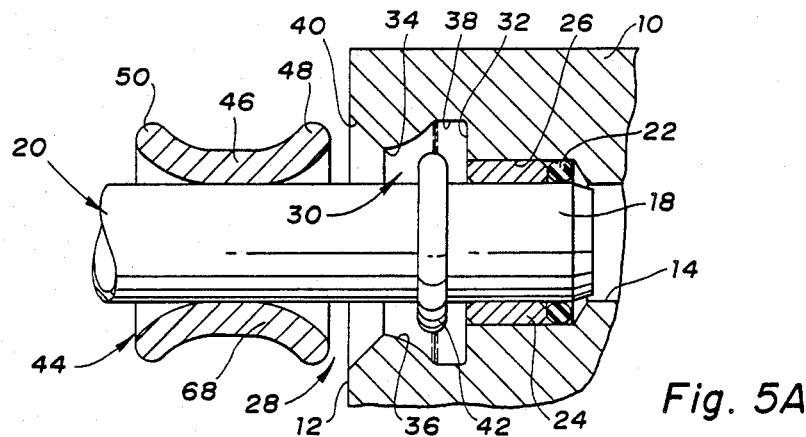
FIGS. 5A-5C are a series of views illustrating installation stages of the fluid coupling according to this invention.
Figure 5B:
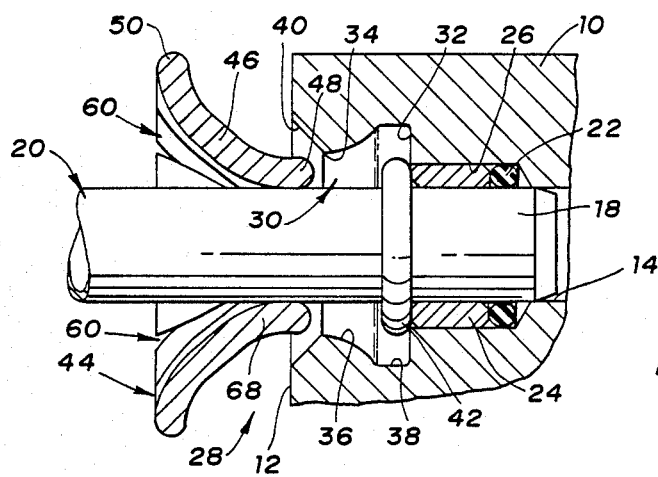
Figure 5C:
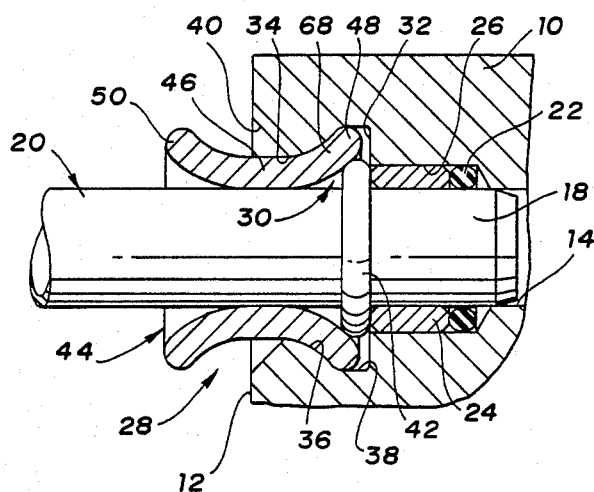

Referring particularly to FIGS. 5A-5C, the installation stages of the fluid coupling 28 are described as follows. The retainer 44 is installed over the pilot section 18 of the tube 20 and is forced across the annular shoulder 42 to a location behind the shoulder. The front end section 48 faces the shoulder 42. The retainer flexes between the front and back slots 52 and 60 so that the inside diameter of the center section 46 of the retainer clears the larger diameter annular shoulder 42 on the tube. The retainer is freely slidable on the outside of the tube 20 behind the annular shoulder.

The pilot section 18 of the tube 20 is plugged into the socket to the aforesaid installed position wherein the annular shoulder 42 seats on the base 32 and the pilot section 18 is gripped by the sleeve 24 and the seal 22. The front end section 48 of the retainer 44 is gripped manually or with a suitable tool, not shown, and squeezed until the effective outside diameter of the forward end section 48 generally equals the diameter of the circular entry 34, FIG. 5B. The skirt portions 54 of the front slots 52 permit the required reduction in the diameter of the front end section 48 while the back slots 60 accommodate a corresponding expansion of the diameter of the back end section 50 of the retainer, FIG. 5B.

The squeezed front end section 48 of the retainer is pushed into the socket 30 through the annulus between the circular entry 34 and the outside of the tube 20, FIGS. 5B-5C, the lead-in chamfer 40 assisting in both centering the retainer in the entry and maintaining the front end section 48 at the smaller diameter necessary to traverse the entry. Once beyond the entry 34, the front end section 48 expands as the retainer is pushed further into the socket 30. Because the contour of the inside wall 36 of the socket 30 closely corresponds with the contour of the front end section 48 of the retainer 44, the retainer expands or unflexes toward its natural state.

The retainer 44 has a seated position in the socket 30, FIG. 5C, characterized by a radially overlapping relationship between the front end section 48 of the retainer and the annular shoulder 42 on the tube. In the seated position of the retainer 44, the radially outboard edge of the front end section protrudes into the clearance groove 38 around the base 32 of the socket. Likewise in the seated position of the retainer 44, part of the center section 46 and all of back end section 50 thereof are located outside the socket. Because the outside diameter of the annular shoulder 42 is located in general alignment with the circular entry 34 and because the retainer substantially completely fills the space between the tube and the inside wall of the socket 30, a shear section 68 of the retainer 44, FIGS. 1 and 5C, is defined between the annular shoulder 42 and the entry 34. The shear section 68 resists withdrawal of the tube from the socket.

The front end section 48 and the back end section 50 are identical for quality assurance rather than as a matter of functional necessity. Functionally, it is only necessary that the front end section be as described and that the back end section not interfere with the operation of the front end section. With both end sections identical, however, it is impossible to assemble the retainer 44 on the tube 20 backwards to that a potential failure mode of the fluid coupling 28 is eliminated.

The embodiments of the invention in which an exclusive property or privilege is claimed are defined as follows:

1. A fluid coupling between an end of a fluid conducting tube and a body member having a fluid conducting passage therein comprising:

means defining an annular shoulder around the outside of said end of said tube, means defining a socket in said body member having a circular entry of diameter generally equal to the diameter of said annular shoulder and an annular base around said fluid passage of diameter exceeding the diameter of said circular entry and a contoured inside wall diverging from said entry to said annular base, said annular shoulder seating against said annular base in an installed position of said end of said tube in said socket wherein an annulus corresponding generally in size to said annular shoulder is defined between said circular entry and the outside of said end of said tube.

a plastic tubular retainer slidably disposed around said tube behind said annular shoulder having a seated position in said socket in said installed position of said end of said tube wherein a cylindrical center section of said retainer is disposed in said annulus between said circular entry and the outside of said end of said tube and an outwardly flared front end section of said retainer having an outside diameter exceeding the diameter of said annular shoulder and a contour matching the contour of said inside wall of said socket radially overlaps said annular shoulder whereby said retainer has a shear section defined between said annular shoulder and said circular entry which resists displacement of said end of said tube from said installed position, means on said retainer defining a plurality of circumferentially spaced front slots therein accommodating squeezing of said front end section of said retainer to the diameter of said circular entry so that said front end section is insertable into said socket through said annulus between said circular entry and the outside of said tube in said installed position of said end of said tube, means on said tubular retainer defining an outwardly flared back end section identical to and at the oppothough
FLUID COUPLING

FIELD OF THE INVENTION

This invention relates to fluid couplings

BACKGROUND OF THE INVENTION

Quick connect fluid couplings generally require only the single step of plugging a free end of a fluid conducting tube into a socket to effect a connection between the tube and the socket. Some quick connect couplings incorporate internal spring finger retention arrangements wherein spring fingers on a retainer on the free end of the tube are captured behind a lip around an entry to the socket, the spring fingers thus being located internally or inside the socket in the installed or plugged-in position of the free end of the tube. A quick connect coupling incorporating an external or outside spring finger retention arrangement is described in U.S. Pat. No. 4,332,402, issued June 1, 1982 to Shellhause and assigned to the assignee of the invention. In that coupling, a barrel shaped retainer having inturned, flexible spring fingers at both ends is mounted on the outside of a cylindrical housing. The spring fingers at one end of the retainer grip an outside groove on the housing to hold the retainer on the latter. The spring fingers at the other end of the retainer cover a portion of the entry to a socket in the end of the housing. When the free end of the tube is plugged into the socket, the spring fingers over the entry lodge behind a shoulder on the tube for retention of the tube. A fluid coupling according to this invention is like a quick connect coupling in that a connection is effected between a tube and a socket by sequentially plugging both the tube and a retainer thereon into the socket and represents a novel alternative to quick connect couplings having internal or external spring finger retention arrangements.

SUMMARY OF THE INVENTION

This invention is a new and improved coupling between the free end of a fluid conducting tube and a socket in a housing. In the coupling according to this invention, the socket has an annular base around an end of a fluid passage in the housing, a smaller diameter circular entry over the base, and a diverging contoured inside wall between the entry and the base. The free end of the tube has an annular shoulder thereon of diameter generally equal to the diameter of the circular entry. A retainer is slidably disposed on the tube behind the annular shoulder and includes a longitudinally slotted, outwardly flared front end section contoured to match the contour of the inside wall of the socket. The free end of the tube is plugged into the socket through the entry to an installed position characterized by engagement between the annular shoulder and the base. The front end section of the retainer is squeezed to the smaller diameter of the circular entry to the socket and forced into the socket between the annular shoulder on the tube and the inside wall of the socket, the remaining or back end section of the retainer projecting out of the socket between the tube and the circular entry. A shear section of the retainer is defined between the circular entry and the annular shoulder on the tube and resists withdrawl of the tube from the socket.

BRIEF DESCRIPTION OF THE DRAWINGS

Figure 4:
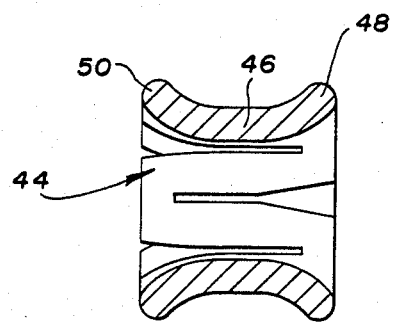
FIG. 4 is a sectional view taken generally along the plane indicated by lines 4—4 in FIG. 3.

FIG. 1 is a cross sectional view of a fluid coupling according to this invention connecting a fluid conducting tube to a housing;

FIG. 2 is an elevational view of a retainer of the fluid coupling according to this invention;

FIG. 3 is a view taken generally along the plane indicated by lines 3—3 in FIG. 2;

FIG. 4 is a sectional view taken generally along the plane indicated by lines 4—4 in FIG. 3; and FIGS. 5A–5C are a series of views illustrating installation stages of the fluid coupling according to this invention.

DESCRIPTION OF A PREFERRED EMBODIMENT

Referring to FIG. 1 of the drawings, a representative body member or housing 10 has a planar wall 12 and an internal fluid conducting passage 14 aligned on an axis 16 of the housing perpendicular to the wall 12. A partially tapered pilot section 18 of a fluid conducting tube 20 at the free or distal end thereof is closely received in the passage 14. A seal ring 22 and sleeve 24 are disposed in an enlarged portion 26 of the passage 14 and grip the pilot section 18 of the tube. A fluid coupling 28 according to this invention connects the fluid conducting tube 20 to the housing 10.

The fluid coupling 28 includes a socket 30 in the housing 10 centered on the axis 16. The socket 30 has an annular base 32 around the enlarged portion 26 of the fluid passage 14, a circular entry 34 above the base 32, and a contoured inside wall 36 which diverges from the entry 34 toward the larger diameter of base 32. The annular base 32 is the part of the bottom surface of the socket 30 surrounding the hole in the bottom surface defined by the enlarged portion 26 of the passage 14 where the enlarged portion intersects the bottom of the socket. The inside wall 36 merges with a clearance groove 38 located immediately adjacent the base 32. The entry 34 defines an inlet to the socket 30 through the planar wall 12 of the housing 10. A lead-in chamfer 40 around the entry 34 opens outward toward the planar wall 12.

The fluid coupling 28 further includes an annular shoulder or bead 42 on the fluid conducting tube 20 which separates the pilot section 18 from the remainder of the tube. The diameter of the annular shoulder 42 exceeds the diameter of the tube 20 and the diameter of the enlarged portion 26 of the passage 14 but is slightly smaller than the diameter of the circular entry 34. In an installed position of the tube 20 relative to the housing 10, FIGS. 1 and 5C, the annular shoulder 42 seats against the base 32 of the socket 30.

The fluid coupling 28 further includes a tubular retainer 44. The retainer 44 is preferably molded plastic, such as heat stabilized, impact modified 6/6 nylon marketed by GI duPont deNemours & Co. as Zytel 3189 HSL, but may be made of metal or other material having suitable performance characteristics. The retainer 44 has a generally cylindrical center section 46, a front end section 48 at one end of the center section, and a back end section 50 at the other end of the center section. The front and back end sections are identical and are outwardly flared or contoured relative to the center section 46 to match the contour of the inside wall 36 of the socket 30. The diameters of the front and back end sections 48 and 50 exceed the diameter of the circular entry 34 and generally equal the diameter of the annular base 32 of the socket 30. The wall thickness of the retainer 44 corresponds generally to one-half the difference between the diameter of the circular entry 34 and the diameter of the tube 20.

As seen best in FIGS. 2 and 3, the retainer 44 is interrupted by a plurality of circumferentially spaced longitudinal front slots 52 which transverse the front end section 48 and the center section 46 of the retainer. Each slot 52 has a flared skirt portion 54 opening through the front end section 48 and a more narrow kerf portion 56 which terminates short of the back end section 50 of the retainer. A plurality of webs 58, FIG. 2, of the retainer are thus defined at the closed ends of the slots 52.

The retainer 44 is further interrupted by a plurality of circumferentially spaced longitudinal back slots 60 which traverse the back end section 50 and the center section 46 of the retainer. The back slots 60 are interposed between respective adjacent pairs of front slots 52. Each back slot 60 has a flared skirt portion 62 opening through the back end section 50 and a more narrow kerf portion 64 which terminates short of the front end section 48 of the retainer. A plurality of webs 66 of the retainer are thus defined at the closed ends of the slots 60.

Referring particularly to FIGS. 5A-5C, the installation stages of the fluid coupling 28 are described as follows. The retainer 44 is installed over the pilot section 18 of the tube 20 and is forced across the annular shoulder 42 to a location behind the shoulder. The front end section 48 faces the shoulder 42. The retainer flexes between the front and back slots 52 and 60 so that the inside diameter of the center section 46 of the retainer clears the larger diameter annular shoulder 42 on the tube. The retainer is freely slidable on the outside of the tube 20 behind the annular shoulder.

The pilot section 18 of the tube 20 is plugged into the socket to the aforesaid installed position wherein the annular shoulder 42 seats on the base 32 and the pilot section 18 is gripped by the sleeve 24 and the seal 22. The front end section 48 of the retainer 44 is gripped manually or with a suitable tool, not shown, and squeezed until the effective outside diameter of the forward end section 48 generally equals the diameter of the circular entry 34, FIG. 5B. The skirt portions 54 of the front slots 52 permit the required reduction in the diameter of the front end section 48 while the back slots 60 accommodate a corresponding expansion of the diameter of the back end section 50 of the retainer, FIG. 5B.

The squeezed front end section 48 of the retainer is pushed into the socket 30 through the annulus between the circular entry 34 and the outside of the tube 20, FIGS. 5B-5C, the lead-in chamfer 40 assisting in both centering the retainer in the entry and maintaining the front end section 48 at the smaller diameter necessary to traverse the entry. Once beyond the entry 34, the front end section 48 expands as the retainer is pushed further into the socket 30. Because the contour of the inside wall 36 of the socket 30 closely corresponds with the contour of the front end section 48 of the retainer 44, the retainer expands or unflexes toward its natural state.

The retainer 44 has a seated position in the socket 30, FIG. 5C, characterized by a radially overlapping relationship between the front end section 48 of the retainer and the annular shoulder 42 on the tube. In the seated position of the retainer 44, the radially outboard edge of the front end section protrudes into the clearance groove 38 around the base 32 of the socket. Likewise in the seated position of the retainer 44, part of the center section 46 and all of back end section 50 thereof are located outside the socket. Because the outside diameter of the annular shoulder 42 is located in general alignment with the circular entry 34 and because the retainer substantially completely fills the space between the tube and the inside wall of the socket 30, a shear section 68 of the retainer 44, FIGS. 1 and 5C, is defined between the annular shoulder 42 and the entry 34. The shear section 68 resists withdrawal of the tube from the socket.

The front end section 48 and the back end section 50 are identical for quality assurance rather than as a matter of functional necessity. Functionally, it is only necessary that the front end section be as described and that the back end section not interfere with the operation of the front end section. With both end sections identical, however, it is impossible to assemble the retainer 44 on the tube 20 backwards to that a potential failure mode of the fluid coupling 28 is eliminated.

The embodiments of the invention in which an exclusive property or privilege is claimed are defined as follows:

1. A fluid coupling between an end of a fluid conducting tube and a body member having a fluid conducting passage therein comprising:

means defining an annular shoulder around the outside of said end of said tube, means defining a socket in said body member having a circular entry of diameter generally equal to the diameter of said annular shoulder and an annular base around said fluid passage of diameter exceeding the diameter of said circular entry and a contoured inside wall diverging from said entry to said annular base, said annular shoulder seating against said annular base in an installed position of said end of said tube in said socket wherein an annulus corresponding generally in size to said annular shoulder is defined between said circular entry and the outside of said end of said tube.

a plastic tubular retainer slidably disposed around said tube behind said annular shoulder having a seated position in said socket in said installed position of said end of said tube wherein a cylindrical center section of said retainer is disposed in said annulus between said circular entry and the outside of said end of said tube and an outwardly flared front end section of said retainer having an outside diameter exceeding the diameter of said annular shoulder and a contour matching the contour of said inside wall of said socket radially overlaps said annular shoulder whereby said retainer has a shear section defined between said annular shoulder and said circular entry which resists displacement of said end of said tube from said installed position, means on said retainer defining a plurality of circumferentially spaced front slots therein accommodating squeezing of said front end section of said retainer to the diameter of said circular entry so that said front end section is insertable into said socket through said annulus between said circular entry and the outside of said tube in said installed position of said end of said tube, means on said tubular retainer defining an outwardly flared back end section identical to and at the oppo-